April 19, 1932.  E. V. HOOBLER  1,855,108
COMBINATION TRUCK AND ROLLER
Filed Dec. 16, 1929  2 Sheets-Sheet 1
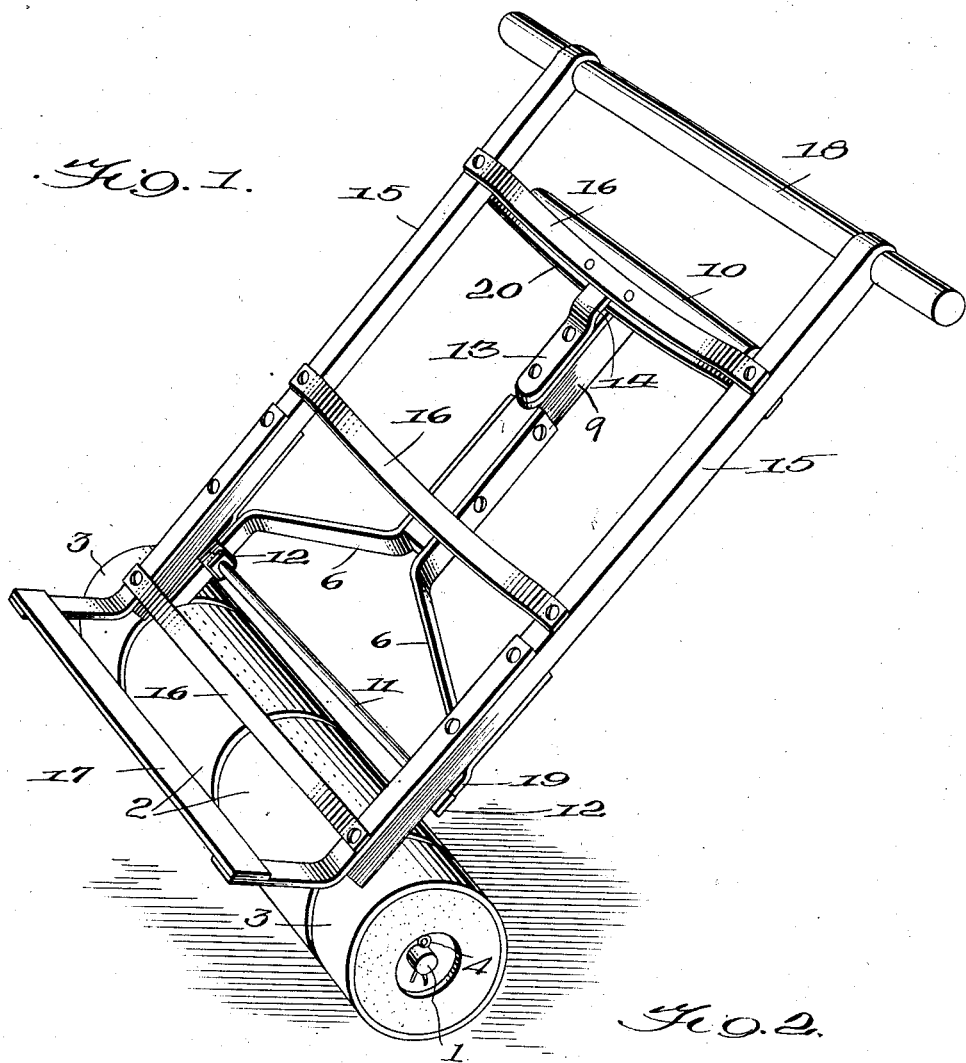
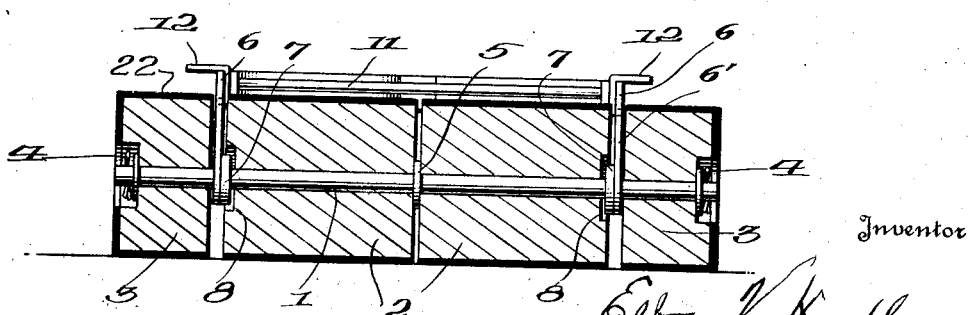

April 19, 1932.  E. V. HOOBLER  1,855,108
COMBINATION TRUCK AND ROLLER
Filed Dec. 16, 1929  2 Sheets-Sheet 2
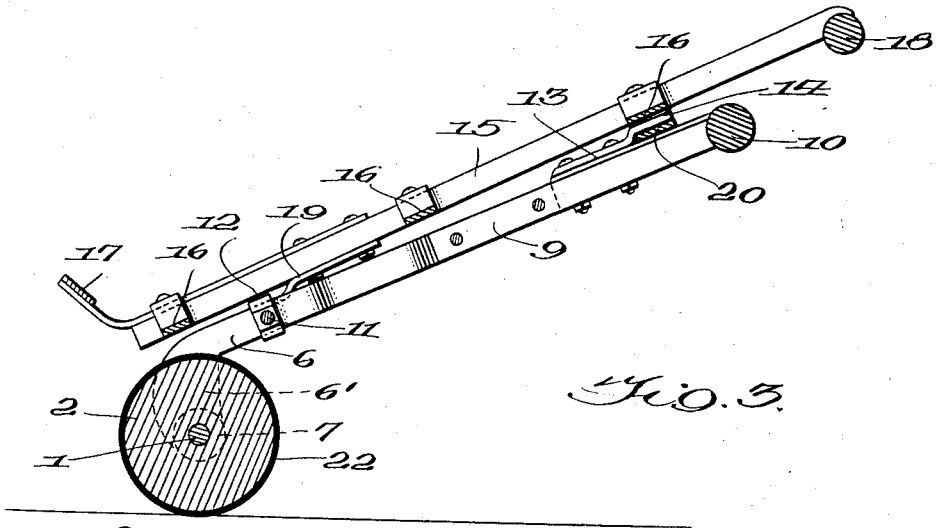
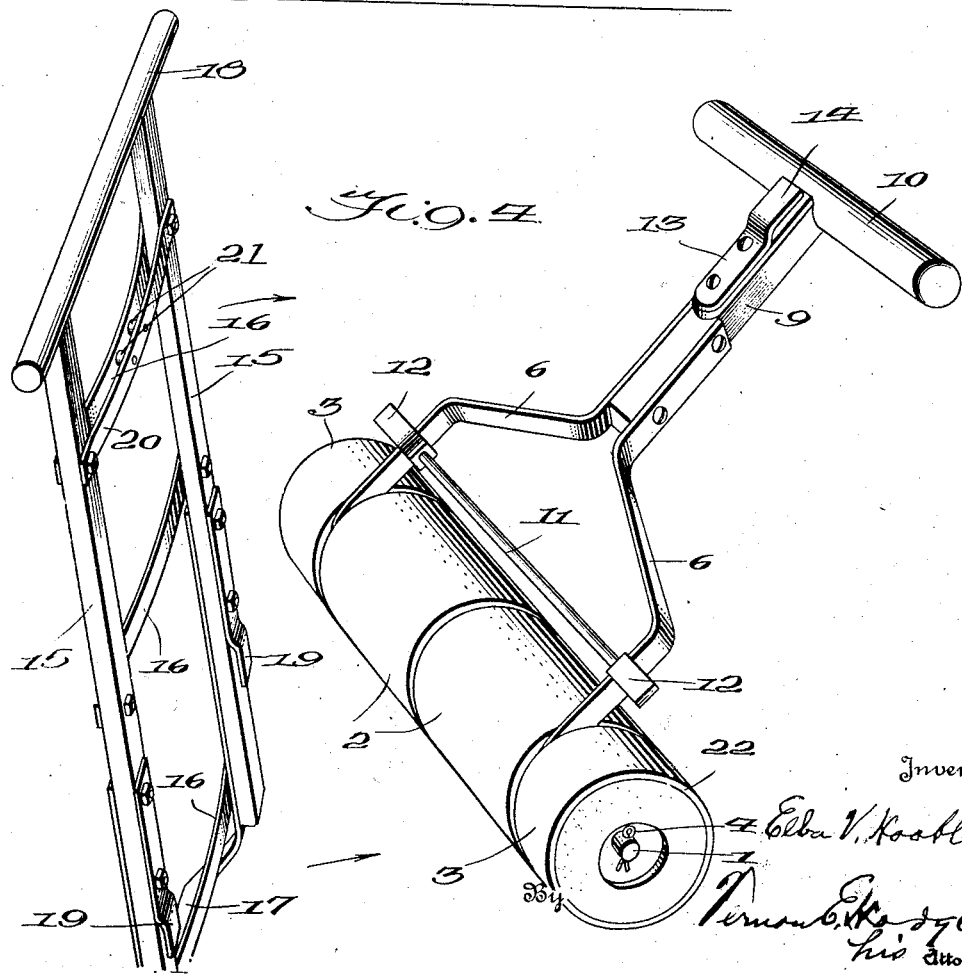

Patented Apr. 19, 1932

1,855,108

UNITED STATES PATENT OFFICE

ELBA V. HOOBLER, OF WATERVILLE, OHIO

COMBINATION TRUCK AND ROLLER

Application filed December 16, 1929. Serial No. 414,537.

This invention relates to an improvement in combination trucks and rollers.

The object of the invention is to provide a combination linoleum roller and a truck so combined and constructed to be used for laying linoleum and rolling it down into place or for transporting it to the desired location on which it is to be used, and yet to have the combined construction sufficiently light in weight in order that it may be suitable for the combined purpose.

In the combined truck and linoleum roller there are a plurality of sections, such as four sections, which permit it to swing to the right or left or to make a short turn without scratching the linoleum on which it is being used, and these sections of the roller are covered with a layer of rubber or similar material to prevent injury to the linoleum in rolling the same in the course of cementing it in place. This is an important feature of the invention, enabling the roller to be used on tile or marble floors as well as on linoleum, because it will not scratch or mar the surface of the floor.

In the accompanying drawings:

Fig. 1 is a perspective view of the complete invention;

Fig. 2 is a sectional view through the rolls of the roller with the truck frame removed;

Fig. 3 is a longitudinal sectional view through the complete invention; and

Fig. 4 is a disassembled perspective view showing the parts of the combined structure.

Mounted on a shaft 1 are one or two rolls 2 and with which there may or may not be used a pair of outer rolls 3, the outer rolls 3 being held in place in any suitable manner, as for instance by cotter-pins 4, while the rolls 2, when two are used, are spaced apart at the center by a washer 5.

The rolls 2 and 3 are spaced from each other sufficiently to receive the ends of forks 6, which are loosely received on the shaft 1, as shown in Fig. 2, and have washers 7 connected therewith and received in openings 8 in the outer ends of the rolls 2, serving to hold these rolls in place. The forks 6 are secured to a handle-bar 9, to the end of which is attached a handle 10 which may be used when the device is used only as a roller, if desired. The forks 6 are braced by means of a rod 11 extending therebetween, to which and the forks 6 are secured outwardly turned hook-shaped flanges 12. A bar 13 is secured to the handle-bar 9 with the outer end thereof bent in spaced relation from the handle-bar to form a hook-shaped portion 14.

The truck frame, which is to be applied to the roller construction, has side bars 15 connected together by the usual straps 16 and at their lower ends have the usual article engaging-plate 17. A handle 18 connects the outer ends of the bars 15.

Instead of the truck engaging frame being mounted on wheels in the usual way, provision is made for attaching it to the linoleum roller, and accordingly hooks 19 are carried by the bars 15 to interfit with hook-shaped flanges 12 on the forks 6, as shown in Figs. 1 and 3, while a strap 20 extends parallel and in spaced relation with one of the straps 16 to receive the hook 14, as also illustrated.

Spacers 21 serve to guide the latter hook in assembling the parts. In order to properly position the truck frame relative to the rolls, the forks 6 have the extreme ends thereof approximately L-shaped, as shown at 6′ in Fig. 3, in order that the truck frame may be positioned above and spaced from the rolls.

The rolls 2 and 3 are usually made of wood or metal, and in order to prevent scratching of the linoleum and to permit the invention to be used in rolling tile or marble without marring the surface thereof, or on any kind of floor on which it may be used, these rolls 2 and 3 are preferably covered with a strip or layer of rubber 22, which protects the surface of the linoleum or floor from any injurious action of the rolls.

The device may be used either as a roller or as a combined roller and truck, the truck frame being detachably connected with the roller construction in order that it may be removed whenever desired, as for instance when the roller is used in rolling linoleum, tile or marble floors, or suitable covers for floors.

It is not necessary to remove the truck frame when rolling the floor or floor covering, and if it is used it will add the additional weight to the rolling action, which is not objectionable. At the same time, the construction is such that further weight may be applied to the roller when found desirable, by very easily carrying a suitable amount of weight on the truck frame. The construction of the frame and the addition of it to the roller facilitates the adding of this additional weight, and in instances where it may be found suitable or desirable it permits the transporting of the linoleum or other objects from place to place, by the usual action of the truck portion of the device.

I claim:

1. In a device of the character described, the combination with a roll or rolls for rolling a surface, a handle frame operatively connected with the roll or rolls, of a hand truck frame carried by the handle frame and having side members and an article engaging member carried thereby and extending laterally of the upper edges of the side members and approximately over and above the roll or rolls, and means detachably connecting the handle and hand truck frames together.

2. A device of the character described, comprising a roll, a handle frame connected therewith, a frame superimposed on the handle frame and longitudinally slidable interengaging means detachably connecting the forward and backward portions of the second frame with the handle frame upon relative longitudinal movement of the two frames for permitting the removal of the second frame.

3. In a device of the character described, the combination with a roll, and a handle connected with the roll, of a truck frame associated with the handle, and longitudinally slidable means for detachably connecting the forward and backward portions of the handle and truck frame together upon relative longitudinal movement of the handle and truck frame.

4. In a device of the character described, the combination with a roll, and a handle connected therewith, of a truck frame associated with the handle and longitudinally slidable interfitting means arranged between the forward and backward portions of the handle and truck frame for detachably connecting the same together upon relative longitudinal movement.

5. In a device of the character described, the combination with a roll, a handle connected therewith, and hook members carried by opposite end portions of the handle, of a truck frame associated with the handle, and means carried by the truck frame for interfitting engagement with the hook members upon relative longitudinal movement of the truck frame and handle.

6. In a device of the character described, the combination with a roll, a handle connected therewith, and hook members carried by opposite end portions of the handle, of a truck frame associated with the handle, and members carried by the truck frame for engagement under the hook members upon longitudinal movement of the truck frame on the handle, to detachably lock the same together.

7. In a device of the character described, the combination with a plurality of rolls, a handle member connected with the rolls and extending therefrom intermediate of the width of the rolls, of a truck frame having side members, and a cross-member, and means detachably connecting the side members and the cross-member with the handle member.

8. In a device of the character described, the combination with a plurality of rolls, and a handle member having a fork connected with the rolls, said handle member extending from the rolls intermediate the width thereof, of a truck frame having side members, and a cross-member, means detachably connecting the side members with the fork, and means detachably connecting the cross-member with the outer portion of the handle member.

9. In a device of the character described, the combination with rolls, and a handle member having a fork connected with the rolls, said handle member extending from the rolls intermediate the width thereof, of a truck frame having side members and a cross member, interlocking hooks carried by the side members and the fork, and interlocking hooks carried by the cross-member and the handle member, said hooks being disposed for interlocking engagement upon relative longitudinal movement of the frame and handle member.

10. In a device of the character described, the combination of supporting rolls, a handle frame having side members connected with the rolls, said side members having outturned hook-shaped flanges, and a truck frame having means for interlocking with the flanges.

11. In a device of the character described, the combination of supporting rolls, a handle frame having side members connected with the rolls, oppositely directed outturned hook-shaped flanges carried by the side members, a rod extending between the side members, approximately in alignment with the flanges, and a truck frame having means for interlocking with the flanges.

12. In a device of the character described, the combination of supporting rolls, a handle frame connected with the rolls, a truck frame connected with the inner end of the handle frame, a transversely extending strap connected with the truck frame, and a fixed hook carried by the handle frame in position for engaging behind the strap in interlocking engagement upon relative longitudinal movement of the frames.

In testimony whereof I affix my signature.
ELBA V. HOOBLER.